: # 2,924,603

ARALKYLBENZMORPHAN DERIVATIVES

Maxwell Gordon, Elkins Park, and John J. Lafferty, Levittown, Pa., assignors to Smith, Kline & French Laboratories, Philadelphia, Pa., a corporation of Pennsylvania No Drawing. Application September 22, 1958
Serial No. 762,243

9 Claims. (Cl. 260—293.4)

This invention relates to a novel series of benzmorphan derivatives having pharmacodynamic activity. More specifically, the compounds of this invention are 2-aralkyl-5,9-dimethyl-2'-hydroxy-6,7-benzmorphans.

This series of compounds possess a high order of pharmacodynamic activity, particularly analgetic or pain relieving activity as well as a certain degree of tranquilizing activity. This activity is also demonstrated following oral, as well as parenteral, administration with a low degree of side effects.

The compounds of this invention are represented by the following structural formula:

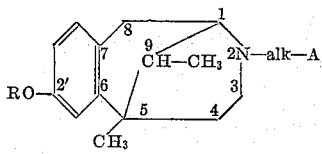

in which R represents hydrogen, methyl or acetyl; A represents N-morpholinyl, a heteroaryl moiety having a 5 or 6-membered ring such as thienyl, furyl, 2-pyridinyl or 4-pyridinyl, or a substituted phenyl such as phenyl monosubstituted in the o or p position by amino, nitro, dialkylamino, acetamido, hydroxy, methoxy or methylthio; and "alk" represents an unsubstituted alkylene chain of from 2 to 4 carbon atoms, preferably ethylene. Advantageously, the compounds of this invention are represented by the structural formula above when R is hydrogen; A is p-aminophenyl, α-thienyl or α-furyl and alkyl is ethylene.

An advantageous and preferred compound is represented by this structure when R is hydrogen, A is p-aminophenyl and alkyl is ethylene.

Also included in this invention are various isomers of the above noted structures, such as cis-trans isomers ("normal" and "iso" series respectively) at the 5,9 positions, the 2,9 positions, or individual optical isomers which might be separated by fractional crystallization of the diastereoisomeric salts formed, for instance, with d- or l-tartaric acid or D-(+)-α-bromocamphor sulfonic acid. The important iso series of compounds is assumed to have the 9-methyl group in the trans or distal position related either to the 5-methyl group or the 2-N-substituent, however, the absolute configuration of these compounds is not readily apparent. The iso compounds are preferred over the corresponding normal isomers.

The term "alk" where used here represents saturated carbon chains with a maximum of 4, and preferably 2, carbon atoms. When disubstituted, such alkylene carbon chains separate the substituents by at least 2 carbon atoms. The term "heteroaryl" is used to describe completely aromatic 5 and 6-membered rings containing at least one atom other than carbon, such as an oxygen, nitrogen or sulfur atom.

The heterocyclic bases of this invention may be used as such or in the form of their nontoxic, pharmaceutically acceptable acid addition salts. Such salts are prepared from suitable acids, such as inorganic acids, for instance, hydrochloric, hydrobromic, sulfuric, phosphoric, or sulfamic acid, or organic acids, for instance, acetic, maleic, ethanedisulfonic, glycolic, salicylic and furamic acids. The acid addition salts are prepared by reacting the base with either one equivalent of acid or preferably an excess in an organic solvent such as ether or an ethanol-ether mixture. Alternatively, an acid salt of the base, say the hydrochloride, can be reacted with a salt such as the ammonium salt of an organic acid in an aqueous mixture to form an insoluble salt by double decomposition.

The 2'-hydroxyl moiety of the compounds of this invention behaves as a normal phenolic hydroxyl in that it can be esterified or etherified with retention of activity. For instance, the acetate can be formed by using an excess of acetic anhydride under standard reaction conditions. The methyl ether can be formed by reaction with diazomethane. These derivatives often have somewhat less activity than the parent compound but are still very active compounds and are considered part of this invention. As a practical matter, the carbon content of the acyl or alkyl portions of these derivatives shall be a maximum of 7. Other acyl moieties exemplary of those included are the benzoate, propionate, isobutyrate, etc. The acetate is preferred.

The starting material, 5,9-dimethyl-2'-hydroxy-6,7-benzmorphan, for the preparation of the N-aralkyl derivatives of this invention, is prepared as follows.

3,4-Lutidine methiodide is condensed with p-methoxybenzyl magnesium chloride by heating in a solvent in which the reactants are at least partially soluble, preferably ethyl ether. Alternatively, other reactive esters or halides may be used to form the lutidine quaternary salt or halides to form the benzyl Grignard reagent. The resulting dihydro base is hydrogenated catalytically with a palladium catalyst to the tetrahydro base which is then cyclized by heating for prolonged periods in the presence of a cyclizing agent, such as 48% hydrogen bromide solution or phosphoric acid. The resulting mixture of isomers is separated into the "normal" and "iso" series by fractional crystallization, preferably from ethyl ether.

The N-methyl compounds so isolated are demethylated at the 2 position, preferably by heating at elevated temperature with cyanogen bromide in an organic solvent in which the reactants are at least partially soluble, preferably a halogenated hydrocarbon, for instance chloroform. The acetyl group is removed by hydrolysis in dilute acid solution.

The N-hydrogen compounds in the iso or normal series are then N-alkylated by either direct alkylation with a reactive aralkyl ester, such as a tosylate or preferably a reactive halide, by heating in a high-boiling, aqueous, miscible solvent such as dimethylformamide or dimethylacetamide in the presence of an alkali metal carbonate, for instance potassium or sodium carbonate or, alternatively, by reaction with the α-arylacetyl chloride or anhydride to form the N-acyl derivative followed by reduction, for instance with lithium aluminum hydride, to give the biologically active compounds of this invention. The aminophenylalkyl derivatives are conveniently prepared by reduction of the corresponding nitro analogues.

The following examples are representative of the methods of preparation and isolation of the aralkylbenzmorphan derivatives of this invention. Modifications of these procedures will be obvious to those skilled in the art and these examples are not to be construed as limiting the scope of this invention.

*Example 1*

A slurry of 25.0 g. of 3,4-lutidine methiodide in 60 ml. of dry ethyl ether is stirred while 400 ml. of an 0.3958 N ethereal solution of p-methoxybenzylmagnesium chloride is added at room temperature. The mixture is stirred for 30 minutes and then decomposed with a solution of 100 ml. of water containing 25 g. of ammonium chloride and 10 ml. of concentrated ammonium hydroxide. The layers are separated. The organic layer is extracted with a solution of 75 ml. of water and 17 ml. of concentrated hydrochloric acid. The extracts are neutralized and taken into ether. The volatiles are evaporated to leave a light yellow oil, the dehydro base.

The oily residue is then hydrogenated at 17 p.s.i. of hydrogen with 5% palladium-on-barium sulfate in 100 ml. of 2 N hydrochloric acid for six hours. The reaction mixture is filtered, made alkaline and taken through ether to give a light oil, the tetrahydro base.

The oily tetrahydro base (about 10.0 g.) in 150 ml. of 48% hydrobromic acid is heated at 135° C. for 24 hours, and then quenched in an ice slurry. Treating with base and taking through chloroform gives a brown residue of the isomeric mixture of 2'-hydroxy-2,5,9-trimethyl-6,7-benzmorphan.

This residue is triturated with ether, cooled and the resulting slurry filtered. The solid product is dissolved in a minimum of dry ethanol and made acidic with ethereal hydrogen chloride. The cooled mixture is filtered to give the hydrochloride salt of the N-methyl-iso-benzmorphan, M.P. 279–282° C., after recrystallization from ethanol. The base melts at 215° C.

The ethereal filtrate is evaporated to give a residue which is neutralized to give the crude normal N-methyl-benzmorphan isomer, M.P. 229–230° C. The hydrochloride salt of this isomer is formed, M.P. 196–198° C., as a hydrate.

Example 2

A mixture of 10.0 g. of the N-methyl-iso-benzmorphan, isolated in Example 1, in 15 ml. of acetic anhydride is heated on the steam bath for about an hour, then quenched in an ice slurry. The mixture is then neutralized and taken through ether to give the O-acetate derivative, iso-2'-acetoxy-2,5,9 - trimethyl - 6,7 - benzmorphan. The crude acetate (9.5 g.) is reacted with 5.0 g. of cyanogen bromide in 100 ml. of chloroform at reflux for several hours. The volatiles are removed in vacuo to leave a residue which is heated at reflux in 150 ml. of dilute hydrochloric acid for 24 hours. The mixture is cooled, neutralized and taken through chloroform to give the desired desmethyl base as a viscous syrup. The syrup can be crystallized to give the crude iso-base melting at 150–155° C. The crude base, 3.3 g., is reacted with 2.6 g. of α-furylacetyl chloride in the presence of an excess of sodium carbonate in water. The mixture is stirred for several hours, diluted with water and taken into ether to give the N-acylated compound. This compound in ether (250 ml.) is reacted with an excess of 1.5 M ethereal lithium aluminum hydride at reflux overnight. The reaction mixture is evaporated to dryness, after quenching carefully with water, to give the crude N-α-furylethyl-iso-benzmorphan derivative.

This compound is dissolved in ether-ethanol and treated with ethereal hydrogen chloride to give the hydrochloride salt which is optionally recrystallized from ethanol.

Example 3

A mixture of 20.0 g. of N-methylbenzmorphan isolated in Example 1 in 30 ml. of acetic anhydride is heated on the steam bath for about an hour, then quenched in an ice-water mixture. After neutralization with carbonate solution, the acetate derivative is taken up in ether. The residue from evaporation (17 g.) is reacted with 9.5 g. of cyanogen bromide in 250 ml. of chloroform at reflux temperature for five hours. The residue from evaporating the mixture is hydrolyzed with hot dilute hydrochloric acid (350 ml.) for 24 hours. The acid mixture is cooled, neutralized with carbonate and extracted into chloroform to give the desmethyl base.

A mixture of 12 g. of 5,9-dimethyl-2'-hydroxy-benzmorphan, 12 g. of 2-(4-nitrophenyl)-ethyl bromide and 8 g. of potassium carbonate in 180 ml. of dimethylformamide is stirred at 95–99° C. for six hours. The cooled mixture is quenched in 1 l. of water, then extracted into etherbenzene. Evaporation gives 5,9-dimethyl-2-β-(4-nitrophenyl) - ethyl - 2' - hydroxybenzmorphan, M.P. 202–203° C.

Example 4

A suspension of 8.4 g. of the nitro compound of Example 3 and 4 g. of 10% palladium-on-charcoal in 400 ml. of methanol at 46 p.s.i. of hydrogen is shaken until the theoretical amount of hydrogen is absorbed. The filtered solution is evaporated to leave a crude residue that is extracted into boiling benzene. The precipitate from benzene is 2-β-(4-aminophenyl)-ethyl-5,9-dimethyl-2'-hydroxybenzmorphan, M.P. 186–187° C.

Example 5

A mixture of 9 g. of the normal desmethyl base, prepared as in Example 3, 7.8 g. of 2-thienylethyl bromide and 6 g. of potassium carbonate in 135 ml. of dimethylformamide is stirred at 97° C. for six hours. The filtered mixture is cooled. Extraction of filtrate with ether, then recrystallization of the residue obtained from ethyl acetate gives 5,9-dimethyl-2-α-thienylethyl-2'-hydroxybenzmorphan, M.P. 151–152° C.

This material (100 mg.) is dissolved in ether and reacted with gaseous hydrogen chloride to separate the hydrochloride salt. Another portion (100 mg.) in ether is reacted with maleic acid in ethyl acetate to give the maleate salt.

Example 6

A solution of 1 g. of 2-β-(4-aminophenyl)-ethyl-5,9-dimethyl-2'-hydroxybenzmorphan from Example 4 in 15 ml. of acetic acid and 15 ml. of acetic anhydride is allowed to stand overnight and then warmed on the steam bath. The solution is quenched, neutralized carefully with carbonate and extracted with ether to give 2'-acetoxy-2-β-(4-acetamidophenyl) - ethyl - 5,9 - dimethylbenzmorphan.

Example 7

A mixture of 4.5 g. of the normal desmethyl base is reacted with 4.6 g. of o-methoxyphenylethyl bromide and 3 g. of potassium carbonate in 100 ml. of dimethylformamide, then heated at steam bath temperature with stirring for eight hours. The reaction mixture is quenched, extracted with ether and worked up as in Example 5 to give 5,9-dimethyl-2-β-(2-methoxyphenyl)-ethyl-2'-hydroxybenzmorphan.

Example 8

A solution of 1 g. of 5,9-dimethyl-2-β-(2-methoxyphenyl)-ethyl-2'-hydroxybenzmorphan from Example 8 in 10 ml. of 48% hydrogen bromide solution is heated at reflux overnight. The mixture is quenched in ice water, neutralized carefully with sodium bicarbonate solution and filtered. The filtrate and solids are extracted with chloroform and ether. Concentration and cooling of the extracts gives crude 5,9-dimethyl-2'-hydroxy-2-β-(2-hydroxyphenyl)-ethylbenzmorphan.

A solution of 500 mg. of the crude base in ether is reacted with hydrogen chloride gas. The crystalline product is the hydrochloride salt.

Example 9

A mixture of 5 g. of isodesmethyl base from Example 2, 4.8 g. of β-2-pyridinylethyl bromide and 3 g. of sodium carbonate in 100 ml. of dimethylacetamide is heated at 96–99° C. for 20 hours with stirring. The reaction mixture is worked up as in Example 5 to give iso-5,9-dimethyl-2'-hydroxy-2-β - (2 - pyridinylethyl) - benzmorphan.

Example 10

A mixture of 6 g. of iso-5,9-dimethyl-2'-hydroxybenzmorphan, 6 g. of 2-(4-nitrophenyl)-ethyl bromide and 4 g. of potassium carbonate in 100 ml. of dimethylformamide is reacted and worked up as in Example 3 to give iso-5,9-dimethyl-2-β-(4-nitrophenyl)-ethyl-2'-hydroxybenzmorphan. This base (2.5 g.) is catalytically hydrogenated in 150 ml. of ethanol using 10% palladium-on-charcoal. Working up the reduction mixture as in Example 4 gives iso-2-β-(4-aminophenyl)-ethyl-5,9-dimethyl-2'-hydroxybenzmorphan.

Example 11

A mixture of 4 g. of normal desmethyl base, 4.9 g. of 2-N-morpholinylethyl iodide, 2.5 g. of potassium carbonate in 150 ml. of dimethylformamide is heated at 100° C. for two days. Working up as in Example 5, gives 5,9-dimethyl-2-β-(N-morpholinyl)-ethyl-2'-hydroxybenzmorphan. This base (100 mg.) in ether is reacted with gaseous hydrogen bromide to give the dihydrobromide salt.

Example 12

A solution of 500 mg. of 5,9-dimethyl-2-β-(α-thienyl)-ethyl-2'-hydroxybenzmorphan in 15 ml. of absolute ethanol and 10 ml. of ethereal diazomethane is stirred in a closed pressure flask for several days. Evaporation gives the crude O-methyl ether of the base.

Example 13

A mixture of 2.5 g. of desmethyl base, 4.8 g. of 2-(p-dimethylaminophenyl)-ethyl bromide and 3 g. of potassium carbonate in 150 m. of dimethyl formamide is reacted and worked up as in Example 5 to give 5,9-dimethyl - 2 - β - (4 - dimethylaminophenyl) - ethyl - 2'-hydroxybenzmorphan.

Example 14

A mixture of 0.9 g. of the iso desmethyl base of Example 2, 0.8 g. of 2-thienylethyl bromide and 1 g. of potassium carbonate in 50 ml. of dimethylformamide is reacted and worked up as in Example 5 to give iso-5,9-dimethyl-2-β-(α-thienyl)-ethyl-2'-hyroxybenzmorphan.

Example 15

A mixture of 6.5 g. of the normal base of Example 1, 5.2 g. of α-furylacetyl chloride is reacted and reduced as in Example 2. The reduction complex is decomposed with hydrobromic acid to give crude 5,9-dimethyl - 2 - β - (α - furyl) - ethyl - 2' - hydroxybenzmorphan hydrobromide.

Example 16

A mixture of 4.5 g. of normal base, 4.2 g. of 3-thienylpropyl bromide and 9 g. of potassium carbonate in 150 ml. of dimethylformamide is reacted and worked up as in Example 5 to give 5,9-dimethyl-2-γ-(β-thienyl)-propyl-2'-hydroxybenzmorphan.

What is claimed is:

1. A chemical compound of the class consisting of a free base and its nontoxic, acid addition salts, the free base having the formula:

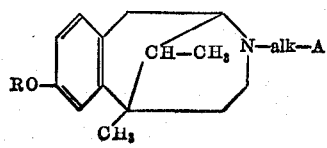

in which R is a member selected from the group consisting of hydrogen, methyl and acetyl; alk is is an alkylene chain of from 2 to 4 carbon atoms; and A is a member selected from the group consisting of N-morpholinyl, thienyl, furyl, pyridinyl, and a phenyl ring monosubstituted in a position selected from the group consisting of the ortho and para positions by a member selected from the group consisting of nitro, amino, methoxy, hydroxy, acetamido, dimethylamino and methylthio.

2. A chemical compound having the basic structural formula:

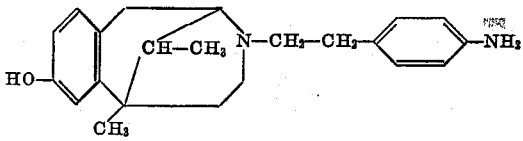

3. A chemical compound having the basic structural formula:

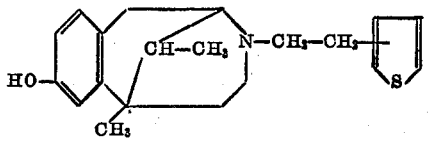

4. A chemical compound having the basic structural formula:

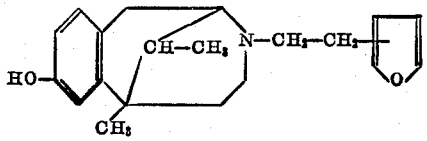

5. A chemical compound having the basic structural formula:

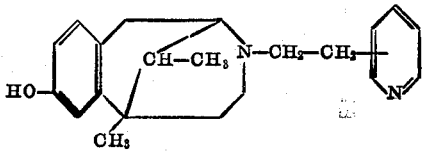

6. Iso - 2 - β - (4 - aminophenyl - ethyl - 5,9 - dimethyl-2'-hydroxybenzmorphan.

7. 5,9 - dimethyl - 2 - β - (2 - methoxyphenyl) - ethyl-2'-hydroxybenzmorphan.

8. 5,9 - dimethyl - 2 - γ - (β - thienyl) - propyl - 2' - hydroxybenzmorphan.

9. 5,9 - dimethyl - 2 - α - thienyl - ethyl - 2' - hydroxybenzmorphan hydrochloride.

References Cited in the file of this patent

UNITED STATES PATENTS

| | | |
|---|---|---|
| 2,619,485 | Chabrier et al. | Nov. 25, 1952 |

FOREIGN PATENTS

| | | |
|---|---|---|
| 550,990 | Canada | Dec. 31, 1957 |
| 837,693 | Germany | May 2, 1952 |
| 126,565 | Sweden | Nov. 8, 1949 |

OTHER REFERENCES

Cronyn: J. Org. Chem., vol. 14, pp. 1013–1022 (1949).